(12) United States Patent
Hardman et al.

(10) Patent No.: US 12,063,881 B2
(45) Date of Patent: Aug. 20, 2024

(54) SOIL TREATMENT APPARATUS (71) Applicant: Novokraft AG, Itingen (CH)

(72) Inventors: Eric Hardman, Riehen (CH); Rob Jansen, Bergeyk (NL)

(73) Assignee: Novokraft AG, Riehen (CH)

( * ) Notice: Subject to any disclaimer, the term of this patent is extended or adjusted under 35 U.S.C. 154(b) by 768 days.

(21) Appl. No.: 17/197,759

(22) Filed: Mar. 10, 2021

(65) Prior Publication Data

US 2021/0267119 A1    Sep. 2, 2021

Related U.S. Application Data (63) Continuation of application No. PCT/EP2019/074188, filed on Sep. 11, 2019.

(30) Foreign Application Priority Data

Sep. 11, 2018  (DE) ..................... 10 2018 122 086.3

(51) Int. Cl.
*A01C 23/02* (2006.01)
*A01B 45/02* (2006.01)
*A01B 63/00* (2006.01)
*A01C 23/00* (2006.01)

(52) U.S. Cl.
CPC ............ *A01C 23/02* (2013.01); *A01B 45/023* (2013.01); *A01B 63/008* (2013.01); *A01C 23/008* (2013.01)

(58) Field of Classification Search
CPC ..... A01C 23/02; A01C 23/008; A01B 45/023; A01B 63/008

USPC ........... 111/127, 129; 405/128.1, 258.1, 269, 405/303
See application file for complete search history.

(56) References Cited

U.S. PATENT DOCUMENTS

| 2,930,334 | A | * | 3/1960 | Marron et al. ...... A01M 17/002 |
| | | | | 222/627 |
| 10,791,663 | B2 | | 10/2020 | Hardman et al. |
| 10,798,862 | B2 | | 10/2020 | Hardman et al. |

FOREIGN PATENT DOCUMENTS

| DE | 10 2008 027 065 A1 | 12/2009 | |
| DE | 10 2015 115 991 A1 | 3/2017 | |
| DE | 10 2016 105 248 A1 | 9/2017 | |
| DE | 10 2016 105 253 A1 | 9/2017 | |
| WO | WO-2017050871 A1 * | 3/2017 | ............ A01B 45/02 |
| WO | WO 2017/148792 A1 | 9/2017 | |

* cited by examiner

*Primary Examiner* — Tara Mayo
*Assistant Examiner* — Tara Mayo-Pinnock
(74) *Attorney, Agent, or Firm* — ASLAN LAW, P.C.

(57) ABSTRACT

A ground treatment apparatus for loosening the ground, in particular in the case of ground with grass growth, comprising a support device and a holding device that is movably held thereon, on which a plurality of injection elements are held, a lifting device, by way of which the injection elements are insertable into the ground and are extractable therefrom, and a fluid provisioning device that comprises at least one reservoir for fluid, which can be supplied with fluid for intermediate storage and which is directly or indirectly in fluidic connection with a plurality of injection elements. The support device and/or the holding device comprise at least one frame made of interconnected structural elements, wherein the at least one reservoir forms a structural element of the frame.

33 Claims, 4 Drawing Sheets

SOIL TREATMENT APPARATUS

CROSS-REFERENCE TO RELATED APPLICATIONS

The present application is a continuation patent application of international application number PCT/EP2019/074188, filed on Sep. 11, 2019, and claims the priority of German application No. DE 10 2018 122 086.3, filed on Sep. 11, 2018, which are incorporated herein by reference in their entirety and for all purposes.

FIELD OF THE INVENTION

The invention relates to a ground treatment apparatus for loosening the ground, in particular in the case of ground with grass growth, comprising a support device and a holding device that is movably held thereon, on which a plurality of injection elements are held, a lifting device, by way of which the injection elements are insertable into the ground and are extractable therefrom, and a fluid provisioning device that comprises at least one reservoir for fluid, which can be supplied with fluid for intermediate storage and which is directly or indirectly in fluidic connection with a plurality of injection elements.

BACKGROUND OF THE INVENTION

A ground treatment apparatus of that kind is described, for example, in DE 10 2016 105 248 A1 and is used for maintaining the ground, wherein, for example, needle-shaped injection elements serve to inject the fluid into the ground. Through the action of the fluid, in particular a compressed gas or compressed gas mixture, specifically compressed air (aerification is referred to in this case), a loosening and thereby a better aeration and drainage of the ground is achieved. Air and water can better penetrate into the ground and the drainage is improved. In the case of ground with grass growth, for example of sport or leisure facilities, the root system can better spread in the soil in order to stimulate growth.

Further ground treatment apparatuses for fluid injection and in particular for aerification are described in DE 10 2015 115 991 A1 and in DE 10 2016 105 253 A1.

Exemplary uses of the present invention are in the case of a soccer field including its bordering regions (sides and outer goal areas, coaching zones . . . ), a football field, a baseball field, a golf course, which may comprise both the green and the fairway, or a tennis court with grass growth. Examples of leisure facilities are green areas in the public domain, such as park facilities. It is also conceivable to use the ground treatment apparatus described here for plantings, in particular in fruit growing or vineyards.

The ground treatment apparatus is advantageously suited for fluid injection (liquid and/or gas/gas mixture) and in particular for aerification of grounds with natural grass and hybrid turf.

The ground treatment apparatuses that are described in the above-mentioned documents prove their worth in practice. In use, the ground treatment apparatus is moved in a working direction, for example, by means of a towing vehicle. By way of the lifting device, the injection elements held on the holding device are introduced into the ground and are lifted up again after the fluid injection. Arranged downstream in the working direction, a roller-shaped bearing device may be arranged on the ground treatment apparatus, which is moved across the sections of the ground surface covered by the fluid injection, with the bearing force distributed, where possible, over the ground by the bearing device.

An object underlying the present invention is to provide a ground treatment apparatus of the kind mentioned at the outset that has a more compact construction.

SUMMARY OF THE INVENTION

In accordance with an aspect of the invention, a ground treatment apparatus for loosening the ground is provided, in particular in the case of ground with grass growth, comprising a support device and a holding device that is movably held thereon, on which a plurality of injection elements are held, a lifting device, by way of which the injection elements are insertable into the ground and are extractable therefrom, and a fluid provisioning device that comprises at least one reservoir for fluid, which can be supplied with fluid for intermediate storage and which is directly or indirectly in fluidic connection with a plurality of injection elements. The support device and/or the holding device comprise(s) at least one frame made of interconnected structural elements, wherein the at least one reservoir forms a structural element of the frame.

BRIEF DESCRIPTION OF THE DRAWING FIGURES

The subsequent description of a preferred embodiment of the invention serves in conjunction with the drawings for further explanation of the invention. In the drawings.

DETAILED DESCRIPTION OF PREFERRED EMBODIMENTS OF THE INVENTION

Although the invention is described and illustrated herein with reference to specific embodiments, it is not intended to be limited to the details described and shown.

The invention relates to a ground treatment apparatus for loosening the ground, in particular in the case of ground with grass growth, comprising a support device and a holding device that is movably held thereon, on which a plurality of injection elements are held, a lifting device, by way of which the injection elements are insertable into the ground and are extractable therefrom, and a fluid provisioning device that comprises at least one reservoir for fluid, which can be supplied with fluid for intermediate storage and which is directly or indirectly in fluidic connection with a plurality of injection elements. The support device and/or the holding device comprise(s) at least one frame made of interconnected structural elements, wherein the at least one reservoir forms a structural element of the frame.

In the case of the ground treatment apparatus in accordance with the invention, provision may be made for the holding device to comprise a frame for mounting the injection elements. Alternatively or in addition, the support device comprises a frame. The frame is composed of interconnected structural elements, and the at least one reservoir forms a structural element of the frame. In other words, at least one structural element of the frame can form a reservoir in which fluid can be intermediately stored. For intermediate storage of the fluid, the at least one reservoir comprises, in particular, a hollow body or is configured as such with a fluid space accommodating the fluid and a wall delimiting the fluid space. With the ground treatment apparatus in accordance with the invention, an integration of functions can be achieved. This enables not only simpler and more cost-effective production, but also a compact design of the ground treatment apparatus. Space for the at least one reservoir can be saved and thus the apparatus can be built more compact.

It is favorable if the holding device has a coupling part and a holding part, wherein the holding device is held on the support device by way of the coupling part and the injection elements are held on the holding part, and if the holding part can be raised and lowered relative to the coupling part by way of the lifting device.

It is advantageous if the coupling part comprises or forms the frame. Alternatively or in addition, provision may be made for the holding part to comprise or form the frame.

The ground treatment apparatus favorably comprises an adjustment device, by way of which the coupling part is moveable and, in particular, displaceable relative to the support device along a working direction of the ground treatment apparatus. The coupling part can therefore also be called a displacement part. The adjustment device, in particular a displacement device, makes it possible to move the holding device by way of its coupling part relative to the support device. This makes it possible, in particular, to ensure a quasi-continuous functioning of the ground treatment apparatus, as is described for example in DE 10 2015 115 991 A1 and in DE 10 2016 105 248 A1.

If the coupling part forms the frame, the frame can be moved and, in particular, displaced with the at least one reservoir relative to the support device, which preferably also comprises a frame, by means of the adjustment device.

The frame of the coupling part advantageously comprises structural elements that form guide elements for the holding part that is displaceable relative to the coupling part. Guides for the lowerable and raisable holding part can thus stiffen the frame.

It is favorable if the lifting device is a constituent part of the holding device and/or if the lifting device is configured as a displacement device.

It is understood that the adjustment device and the lifting device are advantageously controllable by a control device of the ground treatment apparatus.

In an implementation of the ground treatment apparatus, it proves in practice to be advantageous if the adjustment device and/or the lifting device are of hydraulic configuration and if the ground treatment apparatus has a hydraulic motor for providing hydraulic liquid for the adjustment device and/or the lifting device.

Alternatively, provision may be made for the adjustment device and/or the lifting device to be of pneumatic, mechanical, or electrical configuration.

It is advantageous if the adjustment device is coupled to the at least one reservoir and the support device. The adjustment device may engage directly or indirectly, for example by way of a connecting element, on the at least one reservoir. The adjustment device, in the presence of two or more reservoirs, is favorably coupled to at least two reservoirs by way of a structural element of the frame.

It is advantageous if the lifting device is coupled to the at least one reservoir and the holding part. The lifting device may engage directly or indirectly, for example by way of a connecting element, on the at least one reservoir. The lifting device, in the presence of two or more reservoirs, is favorably coupled to at least two reservoirs by way of a structural element of the frame. Provision may be made for the holding device, in particular the holding part, to have a holding body to which the injection elements are fixed by means of fixing elements. For example, the injection elements pass through throughopenings of the holding body, wherein a respective injection element is fixed to an edge of a respective throughopening by means of a fixing part.

The injection elements may preferably be displaceable relative to the holding body against a restoring force of restoring elements acting upon them away from the holding body. The fixing parts preferably form a guide for the injection elements. A respective fluid container associated with an injection element is preferably rigidly connected to a respective outlet valve associated with an injection element and connected to the injection element by way of said outlet valve. The fluid container and the outlet valve are preferably displaceable together with the injection element.

In a preferable embodiment of the ground treatment apparatus, the at least one reservoir is of elongate configuration.

In an advantageous embodiment, it proves to be favorable if the at least one reservoir is oriented in a transverse direction of the ground treatment apparatus and/or horizontally. Indications of orientation and position presently refer to an intended use of the ground treatment apparatus, same being moved, in particular, on the ground surface along a working direction. The transverse direction is oriented transversely and in particular perpendicularly to the working direction. It is assumed that the ground surface is oriented horizontally, and a contact plane of the ground treatment apparatus coincides with the plane defined by the ground surface.

It is advantageous if the at least one reservoir is or comprises a hollow profile that is favorably elongate. This enables a constructively simple configuration of the reservoir. The frame can be given the necessary stiffness by way of the hollow profile. A fluid space of the hollow profile can intermediately store fluid, in particular compressed air, for injection.

It is favorable if cover elements are arranged on the hollow profile or if the hollow profile comprises cover elements, preferably on the end thereof, by way of which cover elements the hollow profile is closed. This makes it possible to manufacture the reservoir in a simple manner. For example, the profile may have end-side openings on which the cover elements are arranged and connected to the hollow profile for closing the fluid space and forming the hollow body. The connection is made, for example, by means of force fit, positive engagement, or material bond, for example by means of welding or screwing.

Provision may be made for the reservoir, in particular the hollow profile, to have a round and preferably circular cross section.

The at least one reservoir is advantageously made of metal.

The at least one reservoir, in particular the hollow profile, is favorably of single-walled configuration. The at least one reservoir thereby preferably has the form of vertical circular cylinder.

In a preferable embodiment of the ground treatment apparatus, it is favorable if the reservoir connects two further structural elements of the frame, arranged at a distance from one another, to one another, and passes through respective through-openings of the further structural elements. The frame can thus be manufactured simply and robustly. For example, the hollow profile mentioned above is guided through through-openings of the further structural elements and closed at the end with the cover element mentioned above.

With the edges of the through-openings, the at least one reservoir is advantageously connected by welding, which makes it possible to achieve a particularly robust design of the frame. Other connection possibilities are also conceivable.

The at least one reservoir preferably connects side parts of the frame to one another, which are preferably of plate-shaped or substantially plate-shaped configuration.

It is advantageous if the frame comprises at least one further structural element that is oriented in parallel to the at least one reservoir and connects the side parts, thus giving the frame an increased robustness.

A further reservoir for intermediately storing fluid is favorably provided, said reservoir connecting the side parts to one another.

In a preferred embodiment of the ground treatment apparatus, the frame comprises or forms bearing elements for bearing, in particular, on the support device, wherein the bearing elements define a bearing plane and the at least one reservoir is arranged above the bearing plane. In this way, the user can easily access the reservoir from above. This proves to be advantageous, for example, when connecting elements for fluid conduits are arranged on the top of the reservoir.

The bearing elements are favorably rollers of the coupling part that is displaceable relative to the support device, which rollers engage in guide elements of the support device. The holding device, in particular the coupling part, can preferably be displaced horizontally relative to the support device. The aforementioned bearing plane is advantageously oriented horizontally. The guide elements of the support device are formed, for example, by structural elements of a frame of the support device.

It is advantageous if the fluid provisioning device comprises two or more reservoirs, which each form a structural element of the frame. This proves to be favorable for rapid work cycles of the ground treatment apparatus. By using two or more reservoirs to intermediately store fluid, the interval between successive injections can preferably be reduced.

Preferably, a respective reservoir is fluidically connected to the same number of injection elements.

The reservoirs are favorably of identical configuration.

It is advantageous if the fluid provisioning device comprises a drivable conveying assembly for fluid, in particular an air compressor, which is fluidically connected to a fluid inlet of the at least one reservoir by way of at least one supply conduit.

If two or more reservoirs are present, provision is advantageously made for same to be connected in parallel to the conveying assembly by way of the at least one supply conduit. Alternatively, provision may be made for two or more reservoirs to be connected to the conveying assembly by way of different supply conduits.

Favorably, at least one valve is connected to the at least one supply conduit in order to unblock and block same. The valve can be controllable by the control device. Alternatively or in addition, a check valve may be provided, which enables a flow of fluid from the conveying assembly to the at least one reservoir and blocks a return flow. Alternatively, a valveless connection by way of the supply conduit is also conceivable.

It proves to be advantageous if the at least one reservoir has two or more fluid inlets to which a respective supply conduit is connected. This presently includes the case that a supply conduit branches into two or more sections, which are connected to a respective fluid inlet. This preferably makes it possible to fill the reservoir more quickly. Intervals between injections of fluid can thereby be reduced.

It is favorable if fluid outlets of the at least one reservoir, to which fluid conduits for fluidically connecting to the injection elements are connected, are arranged between the fluid inlets, or if no fluid outlet is arranged between the fluid inlets and in each case half of the fluid outlets are associated with a respective fluid outlet and are arranged on the side of the fluid inlet facing away from the respective other fluid inlet. This offers the advantage that a flow can form in the reservoir, by way of which fluid flows as quickly as possible from the fluid inlet in the direction of the fluid outlets and quickly fills the reservoir. For example, fluid flows from the fluid inlets arranged on the outside to the fluid outlets positioned therebetween. Alternatively, fluid flows from the centrally arranged fluid inlets to the fluid outlets, of which half are arranged outside of each respective fluid inlet.

Overall, it is advantageous if in the case of n fluid inlets (n being an integer) an nth share of the fluid outlets are arranged near a respective fluid inlet. This preferably proves to be advantageous for the distribution of the fluid to the plurality of fluid outlets with regard to the injection elements being acted upon in a uniform manner and short injection intervals.

It proves to be advantageous if the at least one fluid inlet and fluid outlets are arranged equidistant to one another on the at least one reservoir.

It is favorable if the at least one fluid inlet and fluid outlets are arranged on the top of the at least one reservoir. This makes it easier for the user to access the fluid inlet and the fluid outlets, for example for connecting and/or disconnecting the at least one supply conduit and the fluid conduits mentioned in the following.

It is advantageous if fluid conduits for connecting the at least one reservoir to the injection elements are of the same length or substantially of the same length. This is advantageous for the formation of the same kind of fluid flows from the reservoir to the injection elements with a view to a uniform fluid injection.

In each case a valve that preferably is controllable by the control device is connected to the fluid conduits. Alternatively or in addition, a check valve may be provided, which enables a flow of fluid from the at least one reservoir into the respective fluid container and blocks a return flow. Alternatively, a valveless connection by way of the fluid conduits is also conceivable.

Favorable is a ratio of a length to a diameter of the at least one reservoir of about 10:1 to 30:1, preferably about 15:1 to 25:1.

A volume of the at least one reservoir of about 5 l to 15 l in a preferred embodiment, preferably about 8 l to 12 l, is advantageous.

It is favorable if the injection elements are associated with respective fluid containers and are selectively bringable into flow-connection with the fluid containers by way of a respective outlet valve that is controllable by a control device of the ground treatment apparatus wherein the at least one reservoir is flow-connected to the fluid containers by way of fluid conduits. The intermediately stored fluid preferably flows via the fluid conduits into the fluid containers and is intermediately stored therein. By controlling the outlet valve, the flow connection to the injection element is released, whereupon the fluid can be injected into the ground.

A ratio of a volume fraction of the volume of the at least one reservoir evenly distributed among the number of injection elements to the volume of the fluid reservoir is, in a preferred embodiment, about 1 to 4, preferably about 2 to 3.

A respective fluid container is favorably connected in a straight-line direction to a nozzle at the outlet of the respective injection element.

A respective outlet valve favorably has a valve housing on the entry side of which the respective fluid container is connected, wherein the respective injection element is connected to an output side of the valve housing. The fluid container, the outlet valve and the injection element are favorably rigidly connected to one another.

The ground treatment apparatus favorably has pre-assembled injection units, each comprising or formed by a fluid container, an outlet valve and an injection element, wherein the injection units are preferably releasably connectable to the holding device. The above mentioned fixing part is preferably also part of the injection unit.

It is favorable if the injection elements are exchangeable. For example, the injection elements are of lance-shaped configuration and comprise two sections that are releasably connected to one another. For example, the sections are connected to one another by means of a screw connection and are favorably accessible, in particular from the bottom, without disassembling the ground treatment apparatus. For exchanging the lower section of the injection elements, for example for maintenance purposes and/or for adapting to the ground to be treated, said lower sections can be released from the respective upper section.

A design of a ground treatment apparatus of the aforementioned kind in which sections of the injection elements are releasably connectable to one another can constitute an independent invention within the scope of the present disclosure.

Figure 1:
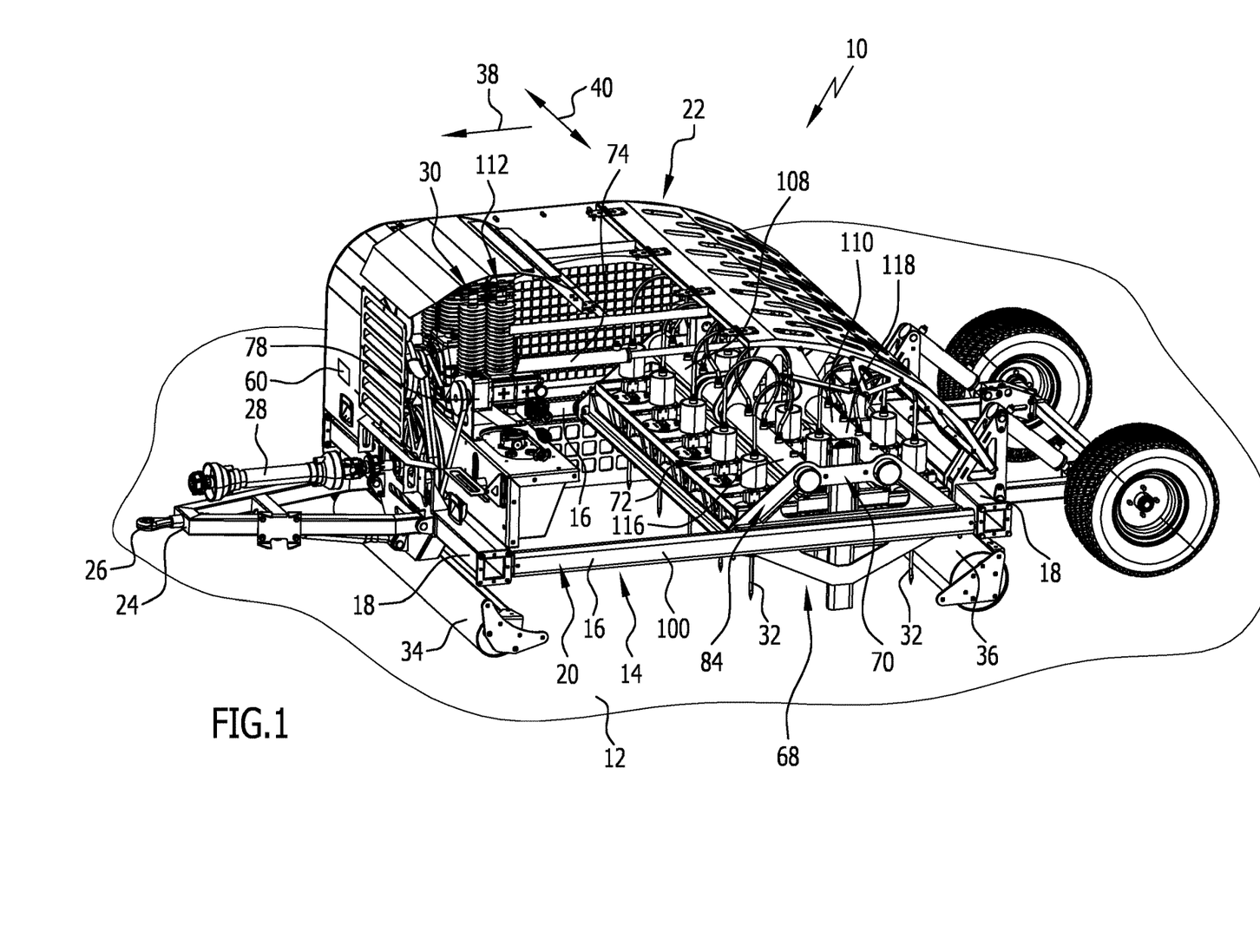
FIG. 1: shows a perspective depiction of a ground treatment apparatus in accordance with the invention, a side wall and further parts of a cladding of the ground treatment apparatus being hidden.

FIG. 1 shows a perspective depiction of an advantageous embodiment, attributed with the reference numeral 10, of a ground treatment apparatus in accordance with the invention, subsequently referred to as apparatus 10 for simplicity.

Further, a ground 12 to be treated by the apparatus 10 is schematically depicted in FIG. 1. The ground 12 includes, in particular, soil and an upper ground surface. For example, the ground 12 may have grass growth if the ground 12 is part of a sport or leisure facility, in particular a football field or a golf course. The grass growth 18 may be rolled turf or natural grass, though a use of the apparatus 10 with hybrid turf is also conceivable.

The apparatus 10 is provided for caring for the ground 12 and for promoting grass growth, with which apparatus an advantageous loosening of the ground, an improved aeration of the ground, dewatering, and drainage effect can be achieved. As a result, the root system of the grass growth can better spread in the ground for promoting growth.

Reference is made to the fact that the present invention is not restricted to the use on ground of the described kind, this serves only for better explanation of the invention.

The apparatus 10 comprises a support device 14 that comprises a support frame 20 formed from longitudinal supports 16 and transverse supports 18. A cladding 22 can be held on the support device 14, which cladding may be configured like a housing. In FIG. 1, a left side wall of the cladding is hidden, as is a part of a top wall and a part of a front wall of the cladding 22.

Arranged on the support device 14 on a front side 24 is a coupling device 26, by way of which the apparatus 10 can be coupled to a towing vehicle not shown in the drawing. A drive shaft 28 can couple to a power take-off shaft of the towing vehicle in order to drive the working units of the apparatus 10.

Alternatively or in addition, provision may be made for the apparatus 10 to be of self-propelled configuration and/or for independent drive devices for the working units to be provided.

The apparatus 10 serves to inject a fluid, presently in particular compressed air, into the ground 12. For this purpose, the apparatus 10 comprises a fluid provisioning device 30, the structure of which is explained below, as well as lance-shaped injection elements 32, which can be acted upon by the fluid. In particular compressed air is presently used as fluid. The compressed air is injected into the ground 12 when the injection elements 32 adopt a lowered position relative to the support device 14.

Roller-shaped bearing devices 34 and 36 are arranged on the support device 14 upstream and downstream, respectively, of the injection elements 32.

"Upstream" and "downstream" refer to an intended use of the apparatus 10, which is moved in a working direction 38. Sections of the ground surface are first traveled over by the bearing device 34 arranged at the front. Compressed air is then injected into the ground 12 via the injection elements 32, which loosens said ground. The loosened ground section is then traveled over by the bearing device 36 following downstream in the working direction. In the intended use, the apparatus 10 is supported only by way of bearing devices 34 and 36.

A transverse direction 40 of the apparatus 10 is oriented transversely and in particular perpendicularly to the working direction 38.

Presently 14 injection elements 32 are provided, the number of which may vary. Three rows of injection elements 32 are provided along the working direction 38, which injection elements in each row are aligned one next to the other in the transverse direction 40. A front row and a rear row each comprise five injection elements 32 and a middle row four injection elements 32.

Figure 4:
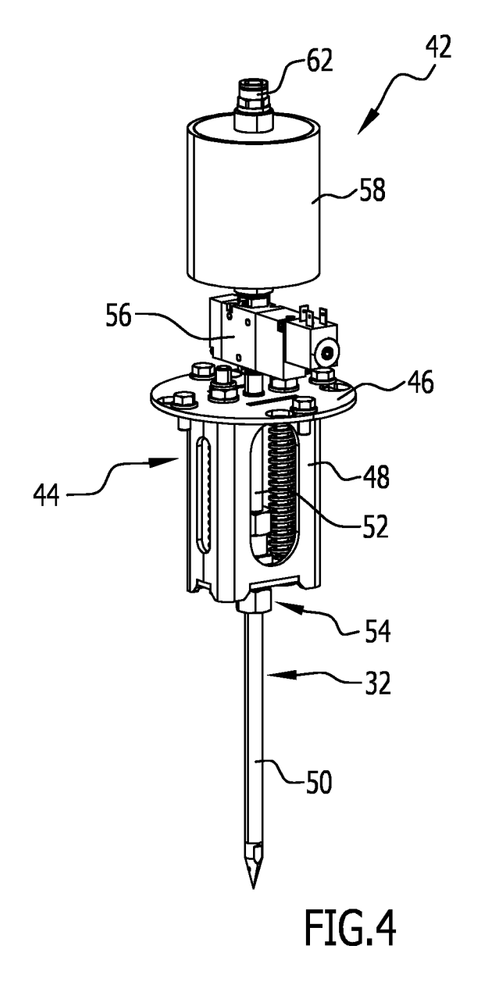
FIG. 4: shows a perspective depiction of an injection unit of the ground treatment apparatus from FIG. 1.
Figure 5:
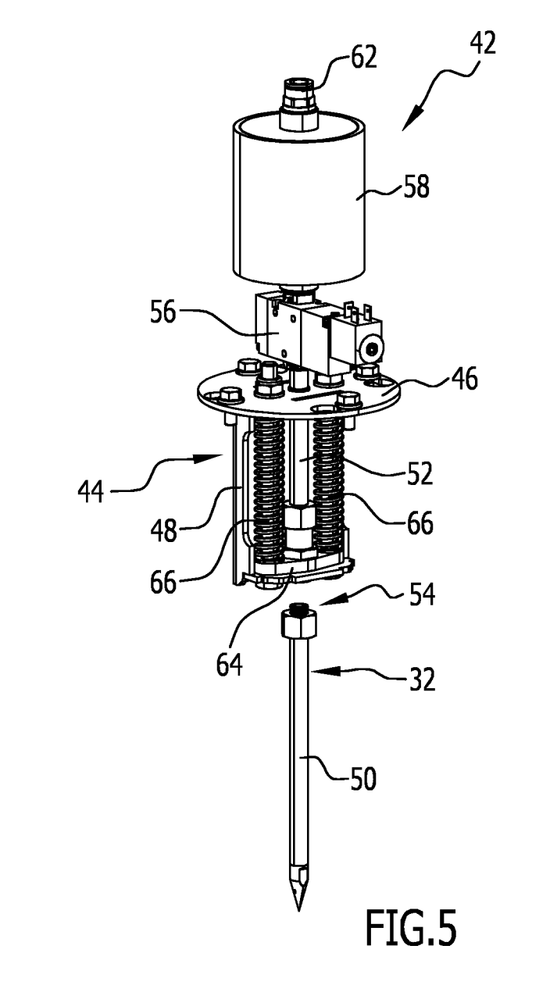
FIG. 5: shows the injection unit from FIG. 4, partially cut open and in an exploded view.

In the present case, the apparatus 10 comprises injection units 42 depicted in FIGS. 4 and 5, which preferably are preassembled. The injection units 42 are of identical configuration.

Each injection unit 42 comprises a fixing part 44 with a flange-type abutment element 46 and a housing 48 forming a hollow body, which is connected to the abutment element 46. The injection elements 32 each have a first, lower section 50 and a second, upper section 52. "Upper" and "lower" refer to an intended use of the apparatus 10, wherein the injection elements 32 are inserted with the underside, i.e. with the first section 50, entirely or partially into the ground 12.

The lower section 50 is releasably connected to the upper section 52, presently by a screw connection 54, though different kinds of connections are possible. This makes it possible for the injection elements 32 to be partially exchanged, for example for maintenance and/or with regard to the conditions of the ground 12. It is advantageous that it is possible to exchange the lower sections 50 without disassembling the apparatus 10. From the underside, the screw connection 54 can be released and the lower section 50 thereby removed from the upper section 52. Conversely, the screw connection can be made from the underside of the apparatus 10.

This favorably results in a fluid-tight connection of the sections 50, 52, wherein in the present case a separate sealing element or a screw connection by means of a sealing cutting ring proves to be advantageous.

Within the scope of the present disclosure, an independent invention is justified in particular by the fact that injection elements 32 can be partially removed without disassembling the apparatus 10.

The injection elements 32 pass through the housing 48 and are fluidically connected to an outlet valve 56 above the abutment element 46, to the inlet side of which outlet valve a fluid container 58 is connected. The outlet valve 56 can be selectively opened and closed by means of a control device 60 in order to unblock or block the fluidic connection from the fluid container 58 to the nozzle arranged on the end of the injection element 32, wherein the outlet valve 56 is released for compressed air injection.

The fluid container 58 comprises a fluid inlet 62, the volume of the fluid container 58 presently amounting to about 0.5 l.

In the housing 48 a support element 64 is fixed to the injection element 32. The support 64 is supported on the abutment element 46 by way of at least one and presently two elastic elements 66, in the present case in the form of coil springs. If the injection element 32 hits an obstacle when being inserted into the ground 12, a displacement may take place against the restoring forces of the elastic elements 66, the outlet valve 56 that is in rigid connection with the injection element 32 as well as the fluid container 58 held on said outlet valve also being displaced.

Figure 2:
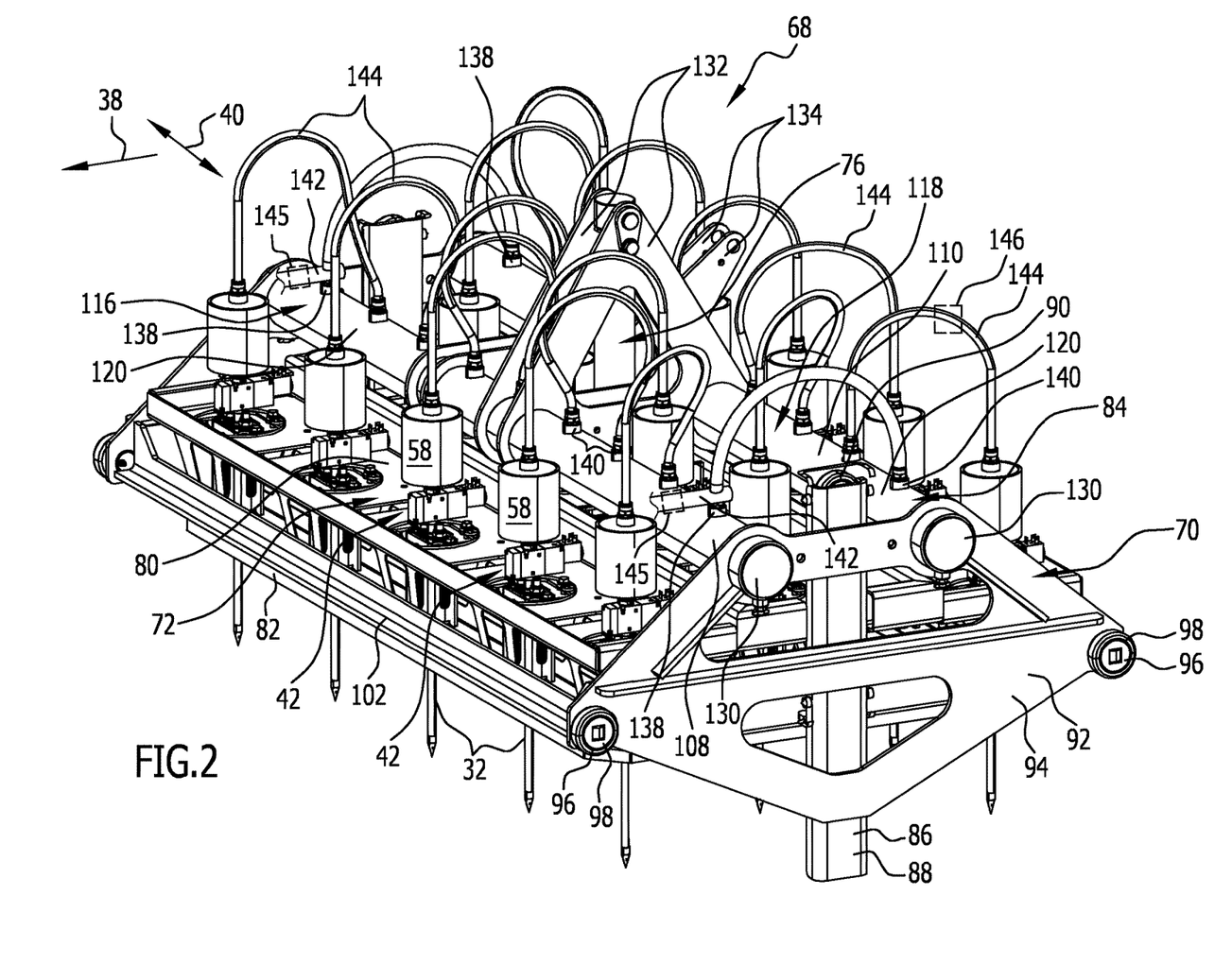
FIG. 2: shows a perspective depiction of a holding device of the ground treatment apparatus from FIG. 1, wherein injection elements are held on the holding device, said holding device comprising a coupling part and a holding part.

The injection units 42 are held indirectly on the support device 14. For this purpose, the apparatus 10 comprises a holding device 68. The holding device 68 has a coupling part 70, shown in perspective in FIG. 3, and a holding part 72 that is raisably and lowerably held thereon (FIG. 2).

An adjustment device 74, presently comprising a piston-cylinder assembly, is provided to displace the coupling part 70 (together with the holding part 72 and the injection elements 32 held thereon) relative to the support device 14. The coupling part 70 can therefore also be referred to as a displacement part.

In addition, a lifting device 76 is provided, comprising a piston-cylinder assembly, in order to lower or raise the holding part 72 and thus the injection elements 32 relative to the coupling part 70 and accordingly insert or extract same into or out of the ground 12.

The adjustment device 74 and the lifting device 76 are presently of hydraulic configuration and are acted upon with hydraulic oil by a hydraulic motor 78 that can be driven by means of the drive shaft 28.

The holding device 68 can, in particular, be displaced in the working direction 38 and counter to the working direction 38. The holding part 72 is lowered or raised transversely and in particular perpendicularly to said working direction.

This makes it possible to quasi-continuously treat the ground 12, as is described for example in DE 10 2015 115 991 A1 and DE 10 2016 105 248 A1, to which reference is made in this regard.

The holding part 72 comprises a holding body 80 that, in the present case, is substantially plate-shaped (FIG. 2). The injection units 42 abut against the holding body 80 by way of the abutment elements 46 and are, for example, connected to said holding body by way of a screw connection. The injection elements 32 pass through the holding body 80 and a bearing body 82. The bearing body 82 is connected to the holding body 80 and bears on the ground 12 when the holding part 72 is lowered.

Figure 3:
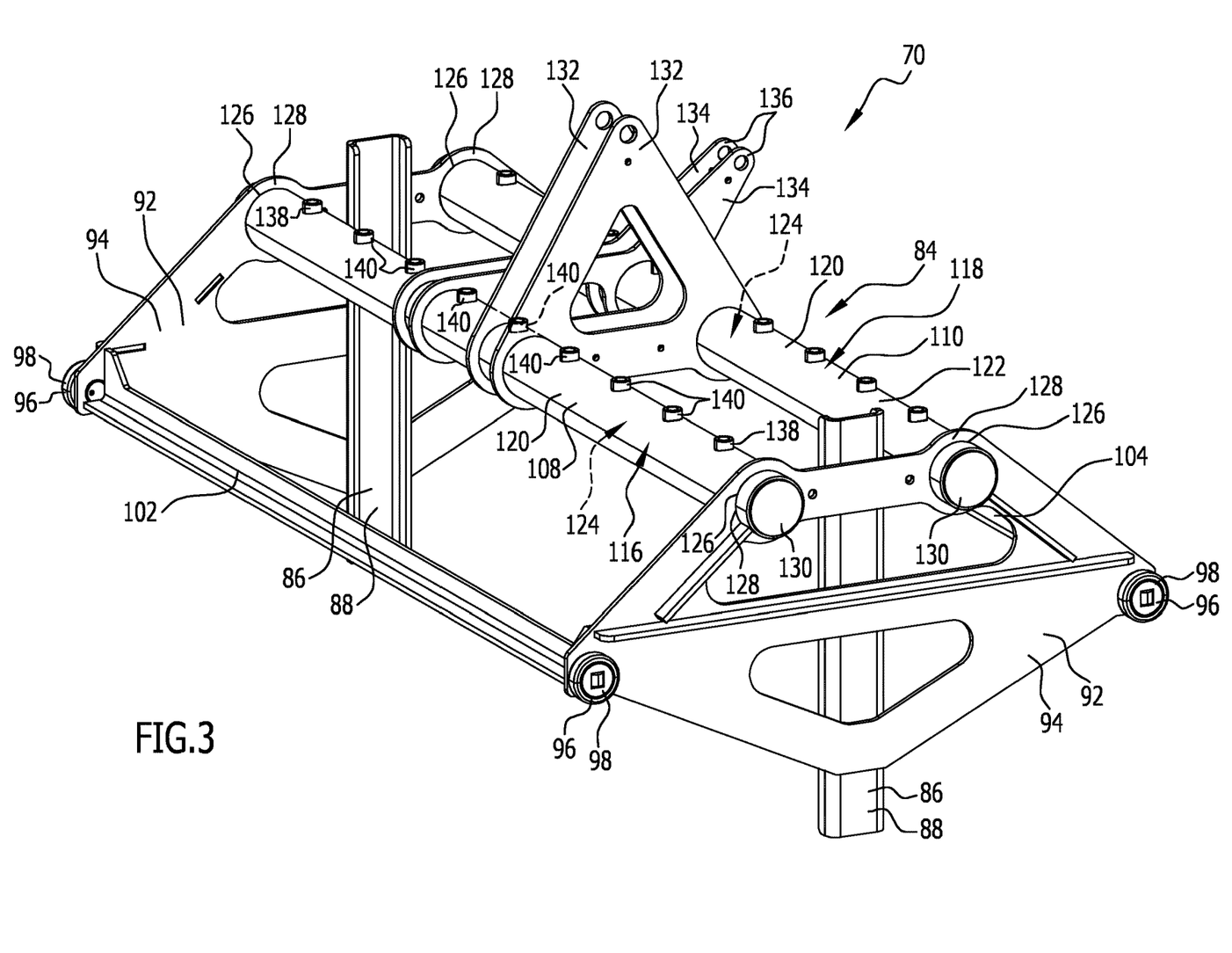
FIG. 3: shows a perspective depiction of the coupling part of the holding device from FIG. 2.

The coupling part 70 is presently configured as a frame 84 made of interconnected structural elements. The frame 84 is preferably made of metal.

The frame 84 comprises two structural elements 86 arranged at a distance from one another in the transverse direction 40. The structural elements 86 are guide elements 88, formed by profiles. The guide elements 88 serve to guide the holding part 72 when raising and lowering relative to the coupling part 70 that engages in the guide elements 88, for example by means of rollers 90.

The frame 84 further comprises the structural elements 92 holding the structural elements 86, the structural elements 92 being spaced at a distance from one another in the transverse direction 40. The structural elements 92 form side parts 94 of the frame 84. The side parts 94 are presently of roughly plate-shaped configuration.

Bearing elements 96 configured as rollers 98 are held on the side parts 94. The rollers 98 bear on guide elements 100 formed by the longitudinal supports 16. In this way, the coupling part 70 and thus the holding device 68 are guided relative to the support device 14 when displaced along the working direction 38.

In the present case, the rollers 98 define a bearing plane which, under the assumption of a horizontal ground surface, is oriented horizontally (in this case parallel to the plane defined by the bearing devices 34, 36).

The side parts 94 are connected to one another by further structural elements 92 of the frame 84. At the front along the working direction 38, a structural element 104 is provided on a front side of the frame 84. A corresponding structural element 106 is provided along the processing direction 38 at the rear, on a rear side of the frame 84. The structural elements 104, 106 are configured as angular profiles.

In addition, the frame 84 comprises two further structural elements 108 and 110. The structural elements 108, 110 are arranged above the bearing plane defined by the rollers 98 and in particular on the top of the frame 84.

The fluid provisioning device 30 comprises a conveying assembly in the form of an air compressor 112, which can be driven by way of the drive shaft 28, in order to provide the fluid and, in particular, the compressed air. The air compressor 112 conveys compressed air and thus acts upon two reservoirs 116 and 118 of the fluid provisioning device 30.

It is favorable in the present case for the reservoirs 116, 118 to form the structural elements 108 and 110, respectively, of the frame 84. In reverse view, the reservoirs 116, 118 are formed by the structural elements 108 and 110, respectively, of the frame 84.

This enables a compact design and constructively simple production of the apparatus 10, in which a functional integration exists between the reservoirs 116, 118 and the frame 84. At the same time, a robust construction of the frame 84 and thus the holding device 68 is made possible.

In the present example, the reservoirs 116, 118 are of identical configuration, therefore only the reservoir 116 is discussed below. The relevant explanations also apply to the other reservoir 118. The reservoir 116 is arranged in front of the reservoir 118 in the working direction 38.

The reservoir 116 is presently formed by means of a hollow profile 120 that has a wall 122 and encloses a fluid space 124. The hollow profile 120 is guided through through-openings 126 of the side parts 94 and is connected to the respective rim 128 of the through-opening 126, in particular by welding.

Openings of the hollow profile 120 arranged on the end are closed by means of a respective cover element 130, which is, for example, attached to the hollow profile 120 by welding. The fluid space 124 is thereby closed. The reservoir 116 is formed by the resulting hollow body with the fluid space 124 and the wall arrangement, which comprises the wall 122 and the walls formed by the cover elements 130.

The configuration described above makes it possible to produce the frame 84 in a simple and cost-effective manner. The initially open hollow profiles 120 are guided through the through-openings 126, welded, and closed by means of the cover elements 130.

The reservoir 116 is oriented in the transverse direction 40 and, in particular, in parallel to the structural elements 104, 106 and to the reservoir 118. The reservoir 116 has a longitudinal extent. For example, the ratio of length to diameter of the reservoir 116 is about 15:1 to 25:1, for example about 20:1.

The reservoir 116 has a round and in particular circular cross section and is configured, in particular, as a vertical circular cylinder.

A volume of the reservoir 116 is preferably about 8 l to 9 l in the concrete implementation of the apparatus 10. Of the, in this case, 14 injection elements 32, seven injection elements 32 are fluidically connected to the reservoir 116, the remaining seven injection elements 32 are fluidically connected to the reservoir 118.

It is favorable if a ratio of a volume fraction of the volume of the reservoir 116 evenly distributed among the number of the injection elements 32 (seven) to the volume of a respective fluid container 58 is about 1 to 4, the ratio presently amounting to about 2.5.

The frame 84 further comprises a pair of identically configured structural elements 132, by way of which the lifting device 76 is coupled to the reservoirs 116, 118. The structural elements 132 are arranged at a distance from one another in the transverse direction 40 and accommodate therebetween the piston-cylinder assembly of the lifting device 76 (FIG. 2). Here, the structural elements 132 are presently triangular in plan view, with two corners of the "triangle" at the positions of the reservoirs 116, 118 and a third corner of the "triangle" at the point of engagement of the piston-cylinder assembly (FIG. 2).

The opposite end of the piston-cylinder assembly engages, for example, on the holding body 80.

The frame 84 further comprises a pair of structural elements 134 that engage on both reservoirs 116, 118. The piston-cylinder assembly of the adjustment device 74 is arranged between the structural elements 134 arranged at a distance from one another in the transverse direction 40 (FIG. 1). The piston-cylinder assembly couples to a respective free end 136 of the structural elements 134. The opposite end of the piston-cylinder assembly couples to the support device 14.

The forces for displacing the holding device 68 and for lowering and raising the injection elements 32 can thus engage on the reservoirs 116, 118 in order to achieve a compact design.

The reservoir 116 presently has two fluid inlets 138 and fluid outlets 140, the number of which corresponds to the number of injection elements 32 connected, in this case seven.

The fluid inlets 138 are formed on the outside of the reservoir 116 in the transverse direction 40, and the fluid outlets 140 are located therebetween. Inlets 138 and outlets 140 are arranged on the top of the reservoir 116 and can thus be easily reached by the user after opening the cladding 22. The inlets 138 and outlets 140 are arranged equidistant to one another on the reservoir 116.

In the present case, the air compressor 112 is in fluidic connection with the reservoir 116 and the reservoir 118 by way of two supply conduits 142, which are connected in parallel to the air compressor 112 (FIG. 2). The compressed air that is conveyed is supplied via the supply conduits 142 to both reservoirs 116 and 118 and fills same. Provision may be made for both supply conduits 142 to be branched sections of only one supply conduit.

Alternatively, different supply conduits may be provided for the reservoirs 116, 118. It is also conceivable that only one supply conduit is connected to each reservoir.

Provision may be made for valves that, in particular, are controllable by the control device to be arranged in the supply conduits 142, on the air compressor 112, or on the reservoirs 116, 118, in order to selectively unblock or block the supply conduits 142. Alternatively or in addition, for example, the use of a check valve in the respective supply conduit 142 is conceivable. FIG. 2 shows schematically with a dashed line a valve 145 in the supply conduits 142. Alternatively, a valveless connection may be provided.

The air provided can be intermediately stored in the reservoirs 116. The arrangement of the fluid outlets 138 on the outside and the fluid inlets 140 therebetween forms a preferably flow of compressed air in the reservoir 116 in such a way that it is quickly filled up to the fluid outlets 140.

The fluid outlets 140 are connected to the fluid inlets 62 of the fluid containers 58 by way of a respective fluid conduit 144. Provision may be made for a valve that, in particular, is controllable by the control device 60 to be connected to the fluid conduit 144 or to be arranged on one of the containers 58, 116, 118. Alternatively or in addition, e.g., the use of a respective check valve is conceivable. FIG. 2 shows schematically with a dashed line a valve 146 in a fluid conduit 144. Alternatively, a valveless connection may be provided.

The compressed air intermediately stored in the reservoirs 116, 118 can be fed via the fluid conduits 144 to the fluid containers 58 and stored therein. By releasing the outlet valves 56 by means of the control device 60, compressed air can be injected into the ground 12 in a targeted manner. In addition to the identical configuration of injection units 42, an equal or substantially equal length of the fluid conduits 144 is an advantage for a uniform action on the ground 12.

REFERENCE NUMERAL LIST 10 ground treatment apparatus
12 ground
14 support device
16 longitudinal support
18 transverse support
20 support frame
22 cladding
24 front side
26 coupling device
28 drive shaft
30 fluid provisioning device
32 injection element
34 bearing device
36 bearing device 38 working direction
40 transverse direction
42 injection unit
44 fixing part
46 abutment element
48 housing
50 first section
52 second section
54 screw connection
56 outlet valve
58 fluid container
60 control device
62 fluid inlet
64 support element
66 elastic element
68 holding device
70 coupling part
72 holding part
74 adjustment device
76 lifting device
78 hydraulic motor
80 holding body
82 bearing body
84 frame
86 structural element
88 guide element
90 roller
92 structural element
94 side part
96 bearing element
98 roller
100 guide element
104 structural element
106 structural element
108 structural element
110 structural element
112 air compressor
116 reservoir
118 reservoir
120 hollow profile
122 wall
124 fluid space
126 through-opening
128 rim
130 cover element
132 structural element
134 structural element
136 free end
138 fluid inlet
140 fluid outlet
142 supply conduit
144 fluid conduit
145 valve
146 valve

The invention claimed is:

1. A ground treatment apparatus for loosening ground, the ground treatment apparatus comprising
a support device;
a holding device movably held on the support device;
a plurality of injection elements being held on the holding device;
a lifting device, by way of which the injection elements are insertable into the ground and are extractable therefrom; and
a fluid provisioning device comprising at least one reservoir for fluid, the at least one reservoir being suppliable with fluid for intermediate storage and being directly or indirectly in fluidic connection with the plurality of injection elements, wherein
at least one of the support device and the holding device comprise(s) at least one frame made of interconnected structural elements, the at least one reservoir forming a structural element of the frame, wherein
the reservoir connects two furthers structural elements of the frame arranged at a distance from one another and passes through respective through-openings of the further structural elements.

2. The ground treatment apparatus in accordance with claim 1, wherein
the holding device has a coupling part and a holding part,
the holding device is held on the support device by way of the coupling part and the injection elements are held on the holding part, and
the holding part is raisable and lowerable relative to the coupling part by way of the lifting device.

3. The ground treatment apparatus in accordance with claim 2, wherein
the coupling part comprises or forms the frame, or wherein the holding part comprises or forms the frame.

4. The ground treatment apparatus in accordance with claim 2, wherein
the frame comprises structural elements which form guide elements for the holding part that is displaceable relative to the coupling part.

5. The ground treatment apparatus in accordance with claim 2, wherein
the lifting device is coupled to the at least one reservoir and the holding part.

6. The ground treatment apparatus in accordance with claim 1, wherein
the ground treatment apparatus comprises an adjustment device by way of which the coupling part is displaceable relative to the support device along a working direction of the ground treatment apparatus.

7. The ground treatment apparatus in accordance with 6, wherein
the adjustment device is coupled to the at least one reservoir and the support device.

8. The ground treatment apparatus in accordance with claim 6, wherein
the fluid provisioning device comprises two or more reservoirs, and
the adjustment device is coupled to at least two reservoirs by way of a structural element of the frame.

9. The ground treatment apparatus in accordance with claim 8, wherein
the fluid provisioning device comprises two or more reservoirs, and
the lifting device is coupled to at least two reservoirs by way of a structural element of the frame.

10. The ground treatment apparatus in accordance with claim 1, wherein
the at least one reservoir is oriented in at least one of a transverse direction of the ground treatment apparatus and horizontally.

11. The ground treatment apparatus in accordance with claim 1, wherein
the at least one reservoir is a hollow profile or comprises a hollow profile.

12. The ground treatment apparatus in accordance with claim 11, wherein cover elements are arranged on ends of the hollow profile, or wherein the hollow profile comprises cover elements, a fluid space of the reservoir being closed by way of the cover elements.

13. The ground treatment apparatus in accordance with claim 1, wherein
the reservoir has a round cross section.

14. The ground treatment apparatus in accordance with claim 1, wherein
the at least one reservoir is made of metal.

15. The ground treatment apparatus in accordance with claim 1, wherein
the at least one reservoir is of single-walled configuration.

16. The ground treatment apparatus in accordance with claim 1, wherein
the at least one reservoir connects side parts of the frame to one another.

17. The ground treatment apparatus in accordance with claim 16, wherein
the side parts are of plate-shaped or substantially plate-shaped configuration.

18. The ground treatment apparatus in accordance with claim 16, wherein
the frame comprises at least one further structural element, which is oriented in parallel to the at least one reservoir and connects the side parts.

19. The ground treatment apparatus in accordance with claim 18, wherein
at least one further structural element comprises a further reservoir of the fluid provisioning device, the further reservoir connecting the side parts to one another.

20. The ground treatment apparatus in accordance with claim 1, wherein
the frame comprises or forms bearing elements for bearing on the support device, which define a bearing plane, wherein the at least one reservoir is arranged above the bearing plane.

21. The ground treatment apparatus in accordance with claim 20, wherein
the bearing elements are rollers of the coupling part that is displaceable relative to the support device, said rollers engaging in guide elements of the support device.

22. The ground treatment apparatus in accordance with claim 1, wherein
the fluid provisioning device comprises two or more reservoirs, which each form a structural element of the frame.

23. The ground treatment apparatus in accordance with claim 22, wherein
a respective reservoir of the two or more reservoirs is fluidically connected to the same number of injection elements.

24. The ground treatment apparatus in accordance with claim 1, wherein
the fluid provisioning device comprises a drivable conveying assembly for fluid, which is fluidically connected to a fluid inlet of the at least one reservoir by way of at least one supply conduit.

25. The ground treatment apparatus in accordance with claim 24, wherein
two or more reservoirs are connected in parallel to the conveying assembly by way of the at least one supply conduit or are connected to the conveying assembly by way of different supply conduits.

26. The ground treatment apparatus in accordance with claim 24, wherein
the at least one reservoir has two or more fluid inlets, to which a respective supply conduit is connected.

27. The ground treatment apparatus in accordance with claim 26, wherein fluid outlets of the at least one reservoir, to which fluid conduits are connected to fluidically connect to the injection elements, are arranged between the fluid inlets, or wherein no fluid outlet is arranged between the fluid inlets and in each case half of the fluid outlets are associated with a respective fluid inlet and are arranged on the side of the fluid inlet facing away from the respective other fluid inlet.

28. The ground treatment apparatus in accordance with claim 24, wherein
the at least one fluid inlet and fluid outlets of the at least one reservoir are arranged equidistant to one another on the at least one reservoir.

29. The ground treatment apparatus in accordance with claim 24, wherein
the at least one fluid inlet and fluid outlets of the at least one reservoir are arranged on the top of the at least one reservoir.

30. The ground treatment apparatus in accordance with claim 1, wherein
fluid conduits for connecting the at least one reservoir to the injection elements are of the same length or of substantially the same length.

31. The ground treatment apparatus in accordance with claim 1, wherein
a ratio of a length to a diameter of the at least one reservoir is about 10:1 to 30:1; and/or
a volume of the at least one reservoir is about 5 l to 15 l.

32. The ground treatment apparatus in accordance with claim 1, wherein
respective fluid containers are associated with the injection elements and are selectively bringable into fluidic connection therewith by way of a respective outlet valve that is controllable by a control device of the ground treatment apparatus, and
the at least one reservoir is flow-connected to the fluid containers by way of fluid conduits.

33. The ground treatment apparatus in accordance with claim 32, wherein
a ratio of a volume fraction of the volume of the at least one reservoir evenly distributed among the number of injection elements to the volume of the fluid container is about 1 to 4.

* * * * *